United States Patent
Meyer

(10) Patent No.: US 10,066,753 B2
(45) Date of Patent: Sep. 4, 2018

(54) SAFETY VALVE

(71) Applicant: Neoperl GmbH, Mullheim (DE)

(72) Inventor: Burkhard Meyer, Emmendingen (DE)

(73) Assignee: Neoperl GmbH, Müllheim (DE)

( * ) Notice: Subject to any disclaimer, the term of this patent is extended or adjusted under 35 U.S.C. 154(b) by 165 days.

(21) Appl. No.: 15/033,776

(22) PCT Filed: Jan. 28, 2015

(86) PCT No.: PCT/EP2015/000158
§ 371 (c)(1),
(2) Date: May 2, 2016

(87) PCT Pub. No.: WO2015/124258
PCT Pub. Date: Aug. 27, 2015

(65) Prior Publication Data
US 2016/0281874 A1    Sep. 29, 2016

(30) Foreign Application Priority Data

Feb. 19, 2014    (DE) .......................... 20 2014 001 442

(51) Int. Cl.
*F16K 17/00* (2006.01)
*F16K 17/30* (2006.01)
(Continued)

(52) U.S. Cl.
CPC .............. *F16K 17/30* (2013.01); *F16K 3/265* (2013.01); *F16K 31/445* (2013.01); *F16K 47/023* (2013.01); *Y10T 137/7729* (2015.04)

(58) Field of Classification Search
CPC ......... Y10T 137/7729; Y10T 137/7785; Y10T 137/7869; Y10T 137/7727; Y10T 137/7728; Y10T 137/7849; F16K 17/30
See application file for complete search history.

(56) References Cited

U.S. PATENT DOCUMENTS 2,583,295 A * 1/1952 Greer ...................... B60T 11/32
137/514.7
3,683,957 A * 8/1972 Sands ..................... F16K 17/26
137/460

(Continued)

FOREIGN PATENT DOCUMENTS

DE          7318404        11/1985
FR           586854         4/1925
(Continued)

*Primary Examiner* — Jessica Cahill
(74) *Attorney, Agent, or Firm* — Volpe and Koenig, P.C.

(57) ABSTRACT

The present invention relates to a safety valve (1) having a valve housing (2), in the housing interior of which there is provided a shut-off body (3) which is held in an open position of the safety valve (1) by at least one elastic retention element (4) counter to the force of a medium flowing through the valve housing (2), in which open position the medium flows through a valve opening (5) in the shut-off body (3). Here, the shut-off body (3) is displaceable in the valve housing (2) such that the shut-off body (3), in the event of a pressure drop on its outflow side, moves against a closing body (7) into a closed position of the safety valve (1) in which the closing body (7), which is acted on by at least one resilient pressing element (8), sealingly closes off the valve opening (5) in the shut-off body (3), wherein at least one bypass duct is provided which, in the closed position of the safety valve (1), can be opened to connect the inflow side of the shut-off body (3) to the outflow side thereof until the shut-off body (3), when the pressure has been equalized by the at least one bypass duct, is moved into the open position of the safety valve (1).

15 Claims, 9 Drawing Sheets

(51) Int. Cl.
    *F16K 31/44*     (2006.01)
    *F16K 47/02*     (2006.01)
    *F16K 3/26*     (2006.01)

(56) References Cited

U.S. PATENT DOCUMENTS

| | | | | |
|---|---|---|---|---|
| 3,910,306 | A * | 10/1975 | Ohrn | F16K 17/34 137/498 |
| 4,195,658 | A | 4/1980 | Dierksmeier et al. | |
| 4,605,039 | A * | 8/1986 | Johnson | F16K 17/30 137/460 |
| 5,474,105 | A * | 12/1995 | Able | F16K 17/30 137/462 |
| 6,443,180 | B1 * | 9/2002 | Samuelson | F16K 17/30 137/460 |
| 2002/0189679 | A1 * | 12/2002 | Avis | F16K 17/30 137/462 |
| 2004/0221893 | A1 * | 11/2004 | Johnson | F16K 17/34 137/498 |
| 2006/0070663 | A1 * | 4/2006 | Schmitt | F16K 17/30 137/462 |

FOREIGN PATENT DOCUMENTS

| | | |
|---|---|---|
| FR | 1097717 | 7/1955 |
| WO | 9847623 | 10/1998 |
| WO | 2011136999 | 11/2011 |

\* cited by examiner

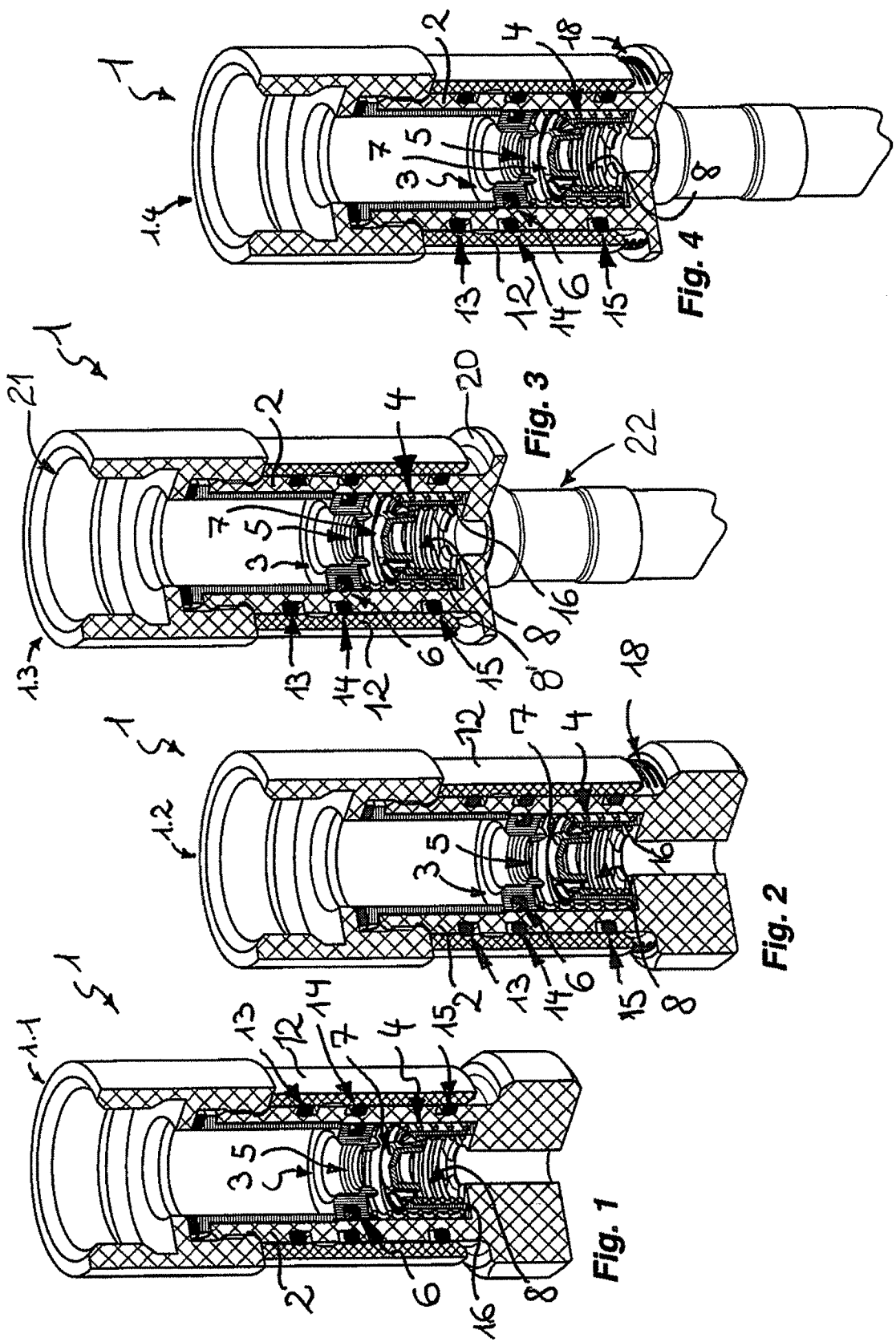

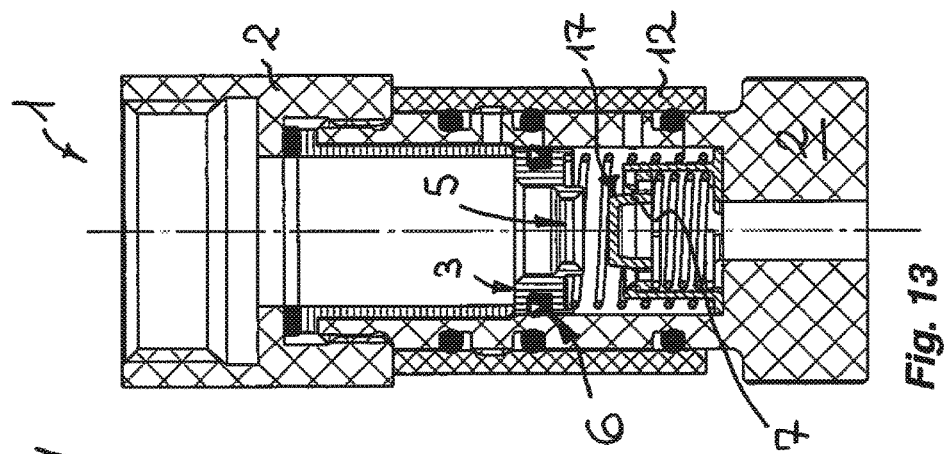
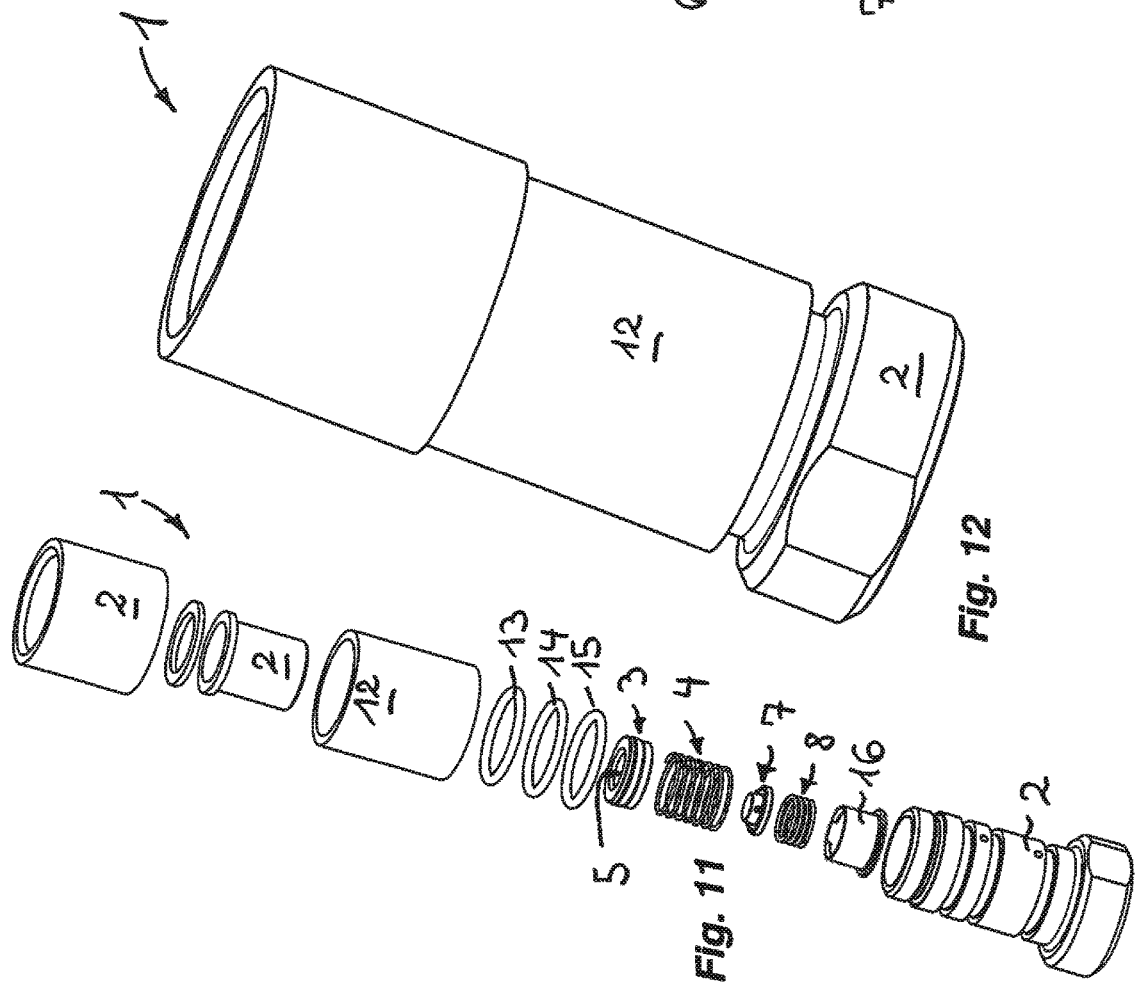

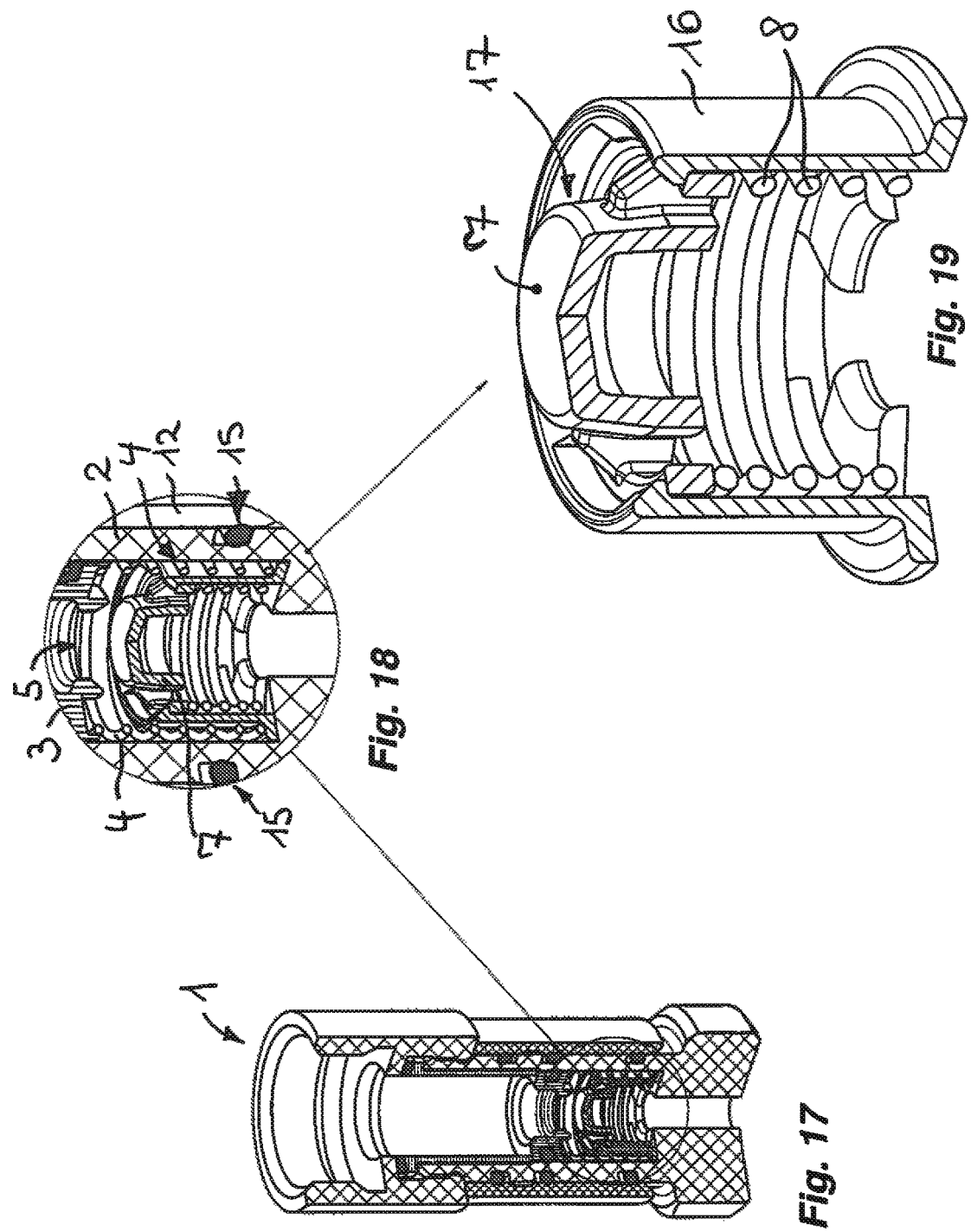

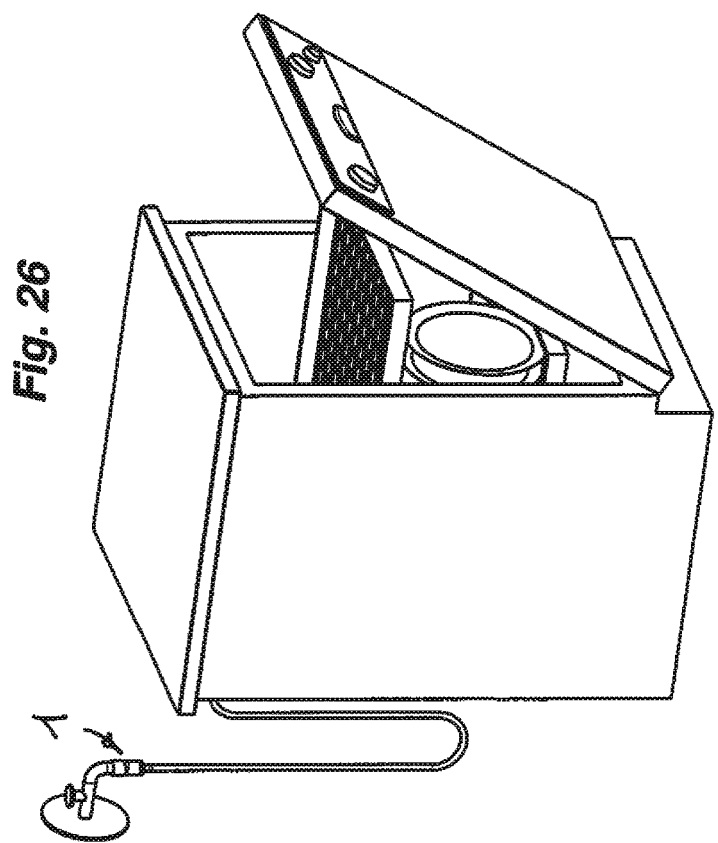
Fig. 26
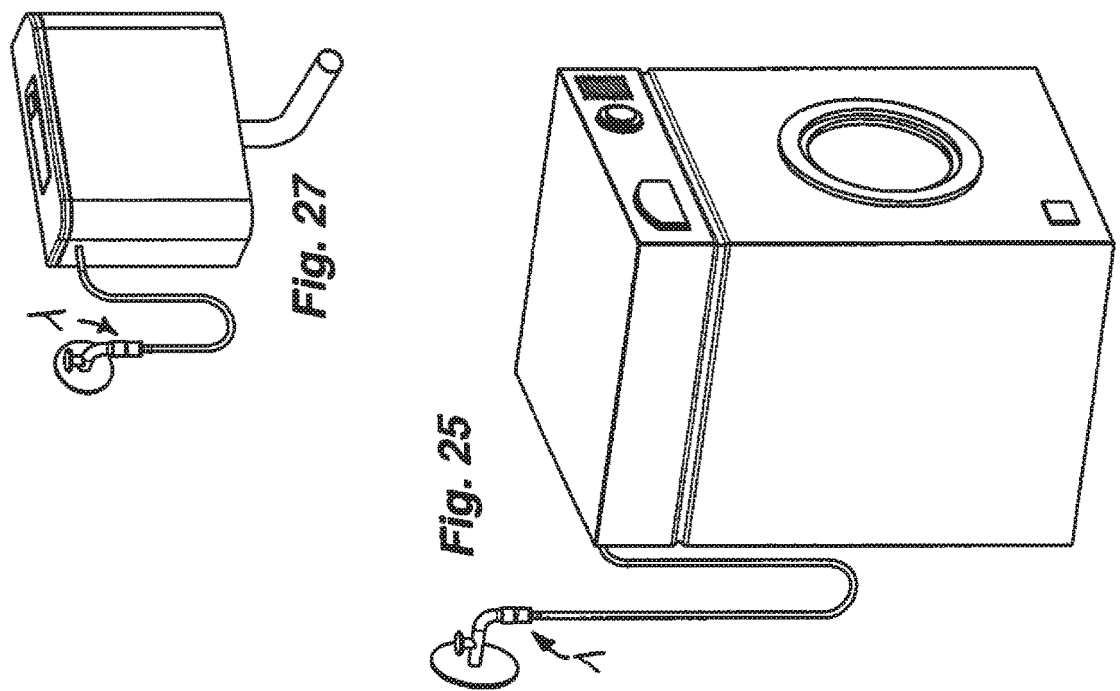
Fig. 27
Fig. 25

SAFETY VALVE

BACKGROUND

The invention relates to a safety valve having a valve housing, in the housing interior of which is provided a shut-off body, which is held by at least one resilient retaining element against the force of a medium traversing through the valve housing in an open position of the safety valve.

WO 2011/136999A1 describes a pressure control valve having a valve housing, in the interior of which a shut-off body is provided, which is held by a resilient retaining element against the force of a fluid traversing through the valve housing in an open position. The shut-off body is displaceable inside the valve housing in such a manner that, in the event of a pressure drop on its outflow side, said shut-off body is moved against a closing body into a closed position of the pressure control valve.

U.S. Pat. No. 4,195,658 A discloses a safety valve for preventing a gas escaping from a closed system. The safety valve comprises a piston-like plug with a head at one end and a bar-shaped body at the other end, and a housing with an inlet chamber which is dimensioned such that the plug is able to enter into the inlet chamber, as a result of which the flow of the gas through an outlet chamber is prevented. If a pressure drop occurs, for example following a pipe fracture, the safety valve is closed by means of a spring force generated by a spring element such that no gas is able to exit from the broken pipe.

Such safety valves regularly serve for automatically shutting-off a pipe which is traversable by a medium, in particular water. The term pipe, in this case, in the sense according to the invention, means any element consisting of an arbitrary form and from arbitrary material, through which a medium, in particular a fluid, for example water, is able to be conducted. Such an element that is intended for conducting through a fluid can be a hose, a tube or a pipeline or a component part of a hose, a tube or a pipeline—a fitting or a valve, for example an angle valve, can also be meant.

These types of safety valves for automatically shutting-off traversable pipes are known from the prior art and are used, for example, in the sanitary sector for the purpose of preventing damage caused by escaping water. In this case, this can be the leaking of pipes, but also completely interrupted pipes, such as, for example, in the case when a hose bursts.

Such safety valves are usually connected to hoses, tubes or pipelines at least in the sanitary sector and serve for the purpose of interrupting the flow of a fluid, for example, of water, as soon as the volume flow of the fluid through the valve has exceeded a certain value. A shut-off body, which regularly acts against the force of the traversing fluid by means of a spring, is usually provided in the interior of such valves for this purpose, the force, which acts against the fluid, being determinable by the spring constant of the spring used and consequently also being variable. The safety valves known from the prior art for automatically shutting-off pipes usually comprise a suitable element, for example a plunger, against which the shut-off body rests when the volume flow is exceeded and consequently enables the fluid pipe to be closed.

In the event of the pipes being completely or even only partially interrupted, a pressure difference is realized with reference to the regions above and below the shut-off body and the safety valve thus performs a shut-off, as a result of which the further escaping of the medium out of the pipe is stopped and damage produced by uncontrolled escaping of the medium is prevented. The safety valves known from the prior art also function according to this principle; after the triggering, i.e. the shutting-off by the safety valve, a pressure equalization must be effected so that, once the pipe that was completely or partially interrupted beforehand has been restored, the regular flow of the medium is able to be effected.

It is also known that such safety valves are also able to be triggered without a generated pressure difference, i.e. also without exceeding the volume flow. This applies in particular in the case of initial installations or other work on the pipe system where air ingress is able to cause a triggering of the safety valve although the pipe in question is intact.

In order to generate this pressure equalization, the disadvantage of the safety valves known from the prior art, however, is that the pressure equalization has usually to be effected by ventilating the safety valve, usually in relation to the atmospheric pressure present. To this end, the safety valve has to be removed from the existing pipe network to which it is connected and then once the pressure equalization has been effected has to be reconnected. A further disadvantage in this connection is that corresponding tools are required for disconnection and connection of such safety valves and consequently a not inconsiderable time expenditure. Additional time expenditure means in the case of the previously known safety valves that in addition the inflow-side valve, which can be provided, for example, as an angle valve, has to be closed prior to disconnection in order to prevent the uncontrolled escape of the medium and then has to be opened again after reconnection.

It is additionally also possible for disconnection and connection only to be able to be carried out by suitable specialist persons, as a result of which not inconsiderable costs can be generated for the end consumer. Disconnection and connection can also represent physical danger to the end consumer due to the increased pressure if there is any mishandling. The safety valves known from the prior art additionally comprise the disadvantageous development that in the event of an abrupt change in pressure, i.e. the pipe being shut off abruptly, the shut-off body used for shutting off experiences a pulse, which opposes the direction of flow of the medium, in such a manner against the element which works the shut-off body, consequently ensures the closing procedure and can be realized for example as a plunger, such that closure is not completely guaranteed at least in the short-term, and consequently in spite of the partially or completely interrupted pipe, medium is able to escape from the shut-off valve and consequently sometimes cause damage.

SUMMARY

Consequently, the object in particular underlying the present invention is to create a safety valve which shuts down automatically in the event of interrupted pipes and guarantees reliable closing in the event of completely or at least partially interrupted pipes and which additionally, with regard to re-starting after the functional shut-off of completely or at least partially interrupted pipes, is distinguished by clearly simplified handling which is preferably also able to be effected in a tool-free manner.

This object is achieved according to the invention with the safety valve of the type mentioned in the introduction in particular with one or more features of the invention.

The safety valve according to the invention has a valve housing, in the housing interior of which is provided a shut-off body. This shut-off body is held by at least one resilient retaining element against the force of a medium traversing through the valve housing in an open position of the safety valve in which the medium flows through a valve opening in the shut-off body. The shut-off body is displaceable in the valve housing in such a manner that, in the case of a pressure drop on its outflow side caused in particular by a fault, said shut-off body is moved against a closing body into a closed position of the safety valve. Such a pressure drop on the outflow side of the shut-off body can be produced, for example, if a hose provided on the outflow side bursts or there is a similar leakage. In the closed position of the safety valve, the closing body, which is acted upon by at least one resilient pressing element, closes the valve opening provided in the shut-off body. The safety valve according to the invention has a bypass duct which, in the closed position of the safety valve, is openable in such a manner that it connects the inflow side of the shut-off body with the outflow side thereof until the shut-off body, when the pressure has been equalized by means of the at least one bypass duct, which is also to be designated as a relief duct or connecting duct, is moved into the open position. The safety valve according to the invention can then be arranged with its valve housing at the outlet end of a supply pipe or inserted into such a pipe. The shut-off body is preferably held in the valve housing in the housing longitudinal direction preferably by at least one resilient retaining element against the force of a medium traversing through the valve housing in an open position of the safety valve. The shut-off body, which is preferably sealed in relation to the housing inside surface of the valve housing, comprises at least one valve opening through which the medium is able to flow with the safety valve in the open position. In the event of a pressure drop on the outflow side, the shut-off body is moved by the pressure prevailing on the inflow side against the closing body into a closed position of the safety valve in such a manner that the closing body, which is acted upon in turn by at least one resilient pressing element, is able to close the valve opening in the shut-off body in a sealing manner. This closing body, which closes the valve opening in the closed position of the safety valve, acts in practice as a damper piston which is displaceable inside the valve housing by means of a resilient pressing element and acts as a damper piston. Once the safety valve according to the invention has been triggered and moved into its closed position, the safety valve according to the invention remains in said closed position until at least one pressure equalization procedure is effected by means of the bypass duct. For the purposes of such a pressure equalization, the bypass duct, with the safety valve in the closed position, is openable in such a manner that it connects the inflow side of the shut-off body to the outflow side thereof. As soon as the pressure has been equalized between the inflow side and the outflow side of the shut-off body by the temporarily openable bypass duct, the shut-off body is moved into the open position of the safety valve once the pressure equalization procedure has been effected. Once the shut-off body has moved back again into the open position of the safety valve, the safety valve according to the invention is available again for a new triggering procedure. The at least one pressing element of the safety valve according to the invention is displaceably guided in a guide sleeve which is arranged in the housing interior of the valve housing by way of its part region remote from the shut-off body.

A preferred embodiment according to the invention provides that the at least one retaining element, which holds the shut-off body against the force of the medium traversing through the valve housing in the open position of the safety valve, is realized as a highly resilient retaining element. In this case, a particularly simple embodiment according to the invention which is linked to low construction and production expenditure provides that the at least one retaining element is realized as a helical spring.

According to a further development proposal according to the invention, it is provided that in addition to this or instead of it, the at least one pressing element is also realized as a highly resilient retaining element and preferably as a helical spring.

So that the at least one pressing element is able to exert its damping force on the closing body which closes the valve opening provided in the shut-off body, it is provided that the at least one pressing element is displaceably guided in a guide sleeve which is arranged in the housing interior of the valve housing by way of its part region remote from the shut-off body.

A particularly compact embodiment which is able to distinguish itself by a comparatively small outside circumference provides that the retaining element which is developed as a helical spring encompasses the guide sleeve.

So that the displaceable component parts of the safety valve according to the invention are able to be guided in a functionally reliable manner and actuated in functionally appropriate manner, it is advantageous when the valve opening is arranged centrally in the shut-off body and preferably coaxially with respect to the shut-off body longitudinal axis thereof.

The bypass duct provided in the safety valve according to the invention can be run up to the outside of the valve housing, a bypass valve also being insertable into said bypass duct. A particularly simple and advantageous embodiment, which is distinguished by simple and functionally reliable handling, provides, in contrast, that the bypass duct has three duct sections, of which the mouth-side duct sections are realized as flow-through holes in the valve housing, wherein the mouth-side duct sections are connectable by a duct section which is located in between them and delimits or borders a sleeve-shaped sliding element which is displaceably guided on the outside circumference of the valve housing. If this sliding element on the outside circumference of the valve housing is moved into the duct open position of the bypass duct, the three interacting duct sections of the bypass duct are connected together in such a manner that a pressure equalization procedure between the inflow side and the outflow side of the shut-off body is preset. In the case of such a pressure equalization procedure, the shut-off body is moved by the resilient retaining element acting upon it against the force of a medium traversing through the valve housing into the of the safety valve, in which open position the shut-off body remains until the safety valve is triggered once again.

It is expedient when the sliding element is displaceable on the outside circumference of the bypass duct from the duct closed position against a return force into the duct open position of the bypass duct. As the sliding element in said embodiment is always moved again by the return force into the position corresponding to the closed position of the safety valve, operating errors are avoided and the safety valve according to the invention is always held ready for renewed triggering.

In order to keep the expenditure connected to the construction and production of the safety valve according to the invention as low as possible, it is expedient when the return element is also realized as a highly resilient return element and preferably as a helical spring.

A particularly advantageous embodiment according to the invention provides that the sliding element, which is moved into the duct open position by the return element, butts against a slide stop. As the slide element, which is moved back by the return element, butts against the slide stop, the user is clearly able to recognize when the safety valve is situated in its open position again and the safety valve is ready for renewed triggering.

The safety valve according to the invention can be used advantageously wherever the pipe sections arranged on the outflow side of the safety valve have to be secured against uncontrolled escaping of the medium conducted in the pipe as a result of a burst pipe or similar leakage. In this case, a preferred application example provides that the valve housing comprises a fitting connection on the inflow side and/or a hose connection on the outflow side. In particular, a hose, which is provided on the outflow side and is connected to the hose connection of the safety valve according to the invention, is consequently able to be secured against an unintentional and uncontrolled leakage.

In this case, it is advantageous when the valve housing is connected to a supply pipe at its inflow-side fitting connection and in particular to a wall-side angle valve of a supply pipe.

Further developments according to the invention are produced from the claims in conjunction with the description and the drawings. The invention is described in more detail by way of advantageous exemplary embodiments.

BRIEF DESCRIPTION OF THE DRAWINGS

The drawings are as follows:

FIG. 1 shows a part-sectioned perspective representation of a safety valve, which safety valve serves for automatically shutting-off a pipe which is traversable by a medium, in particular water, in the event of a sudden pipe fracture, wherein said safety valve is provided with a shut-off body which is held by a resilient retaining element, and in particular by a retaining spring, against the force of the traversing medium in the open position of the safety valve shown here, and wherein there is provided at least one bypass duct which is openable by a sliding element which is manually actuatable on the outside in such a manner that the bypass duct connects the inflow side of the shut-off body to the outflow side thereof until the shut-off body, once the pressure equalization procedure has been effected by the at least one bypass duct, is moved into the open position, FIG. 2 shows a safety valve, which is also shown in a part-sectioned perspective representation and is comparable to FIG. 1, in its open position, wherein the sliding element, which is manually actuatable on the outside, in this case is movable against the return force of a return element, and in particular of a return spring, from a duct closed position into a duct open position, FIG. 3 shows a safety valve, which is also shown in a part-sectioned perspective representation and is comparable to FIG. 1, which in this case comprises a pipeline connection with an internal thread on the inflow side and a hose connection for connection to a flexible hose on the outflow side, FIG. 4 shows a safety valve, which is also shown in a longitudinally sectioned perspective representation and is comparable to FIG. 3, the manually actuatable sliding element of which on the outside is movable against the return force of a return spring from the duct closed position into the duct open position, FIG. 11 shows an exploded representation of the individual parts of the safety valve from FIGS. 1 and 5 to 10, FIG. 12 shows a side view of the safety valve from FIGS. 1 and 5 to 11, FIG. 13 shows a longitudinally sectioned side view of the safety valve from FIGS. 11 and 12, FIG. 17 shows the part-sectioned perspective representation of the safety valve from FIG. 1, FIG. 18 shows a representation of a detail of the safety valve shown in FIG. 17 in the region of the sliding element which closes the valve opening in the shut-off body, FIG. 19 shows the sliding element of the safety valve shown in FIGS. 17 and 18, which sliding element is acted upon by a pressing element, which is realized here as a compression spring, and is displaceably guided in a guide sleeve, FIG. 25 shows an application example where the safety valve is inserted into the water pipe leading to a washing machine, FIG. 26 shows an application example where the safety valve is inserted into the water pipe leading to a dishwasher, and FIG. 27 shows an application example where the safety valve according to the invention is inserted into the water pipe leading to a cistern of a toilet.

DETAILED DESCRIPTION OF THE PREFERRED EMBODIMENTS

Figure 7:
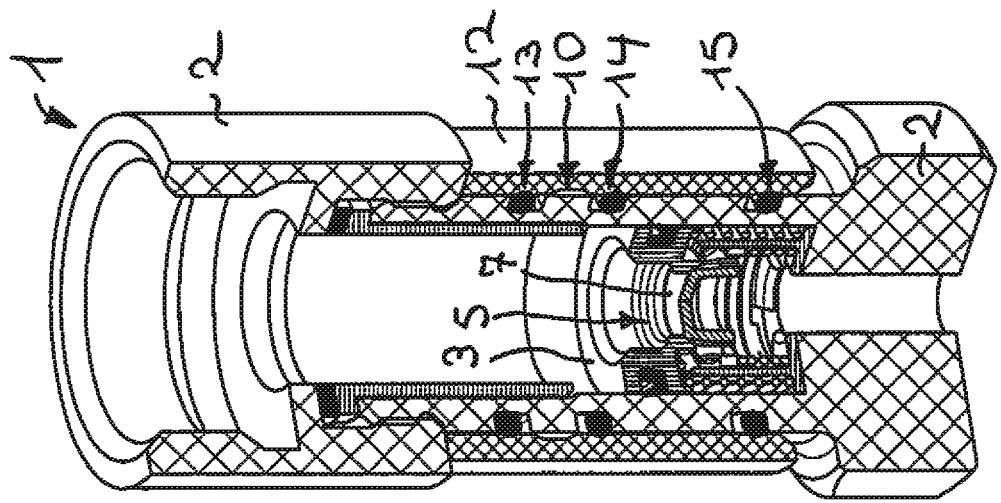
FIG. 7 shows the longitudinally sectioned safety valve from FIGS. 5 and 6, which is also situated in its closed position, in the case of a pressure shock coming from the inflow side where the closing body, which acts as a damping piston, is additionally pressed against a highly resilient pressing element.
Figure 6:
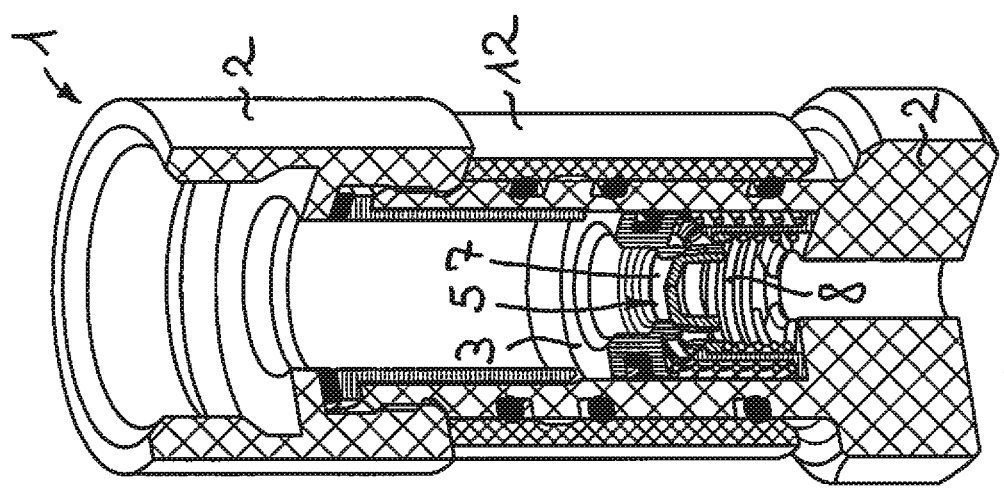
FIG. 6 shows the safety valve from FIG. 5, also in a longitudinal section, in its closed position which was triggered by a sudden pressure drop on the outflow side of the shut-off body and in which a valve opening, provided in the shut-off body and arranged centrally in this case, is closed in a sealing manner by a closing body which is acted upon by the shut-off body.
Figure 5:
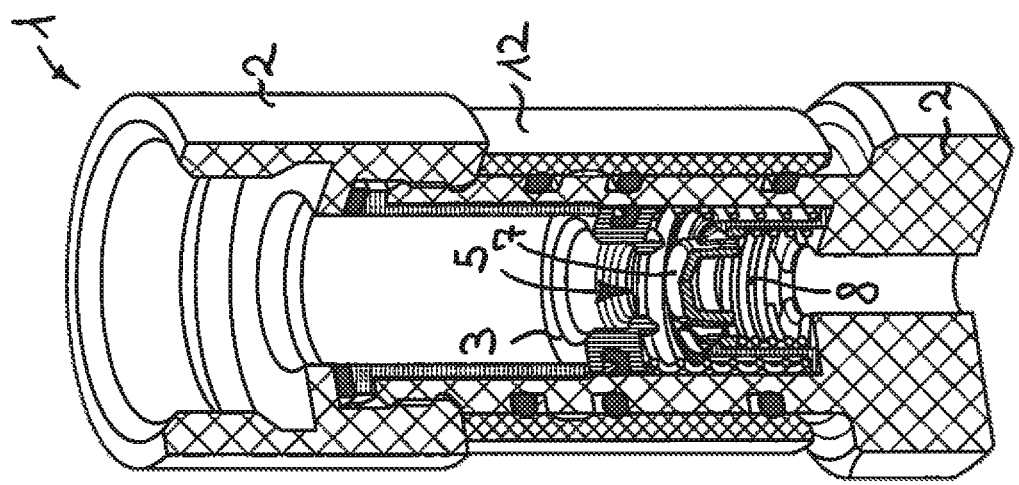
FIG. 5 shows an enlarged longitudinal section of the safety valve from FIG. 1 in its open position.

FIGS. 1 to 27 show a safety valve 1 in different realizations 1.1, 1.2, 1.3 and 1.4. The safety valve 1 serves for automatically shutting-off a pipe which is traversed by a medium and in particular by water. The safety valve 1 is to prevent uncontrolled escaping of the medium when a pipe section on the outflow side of the shut-off or safety valve 1 suddenly bursts or becomes leaky in another manner. It is clear from the application examples in FIGS. 23 to 27 that the safety valve 1 can be inserted for this purpose, for example, into the supply pipe to a consumer.

The safety valve 1 comprises a valve housing 2 which is sleeve-shaped here and in the housing interior of which a shut-off body 3 is provided. This shut-off body 3 is held by at least one retaining element 4 against the force of a medium traversing through the valve housing 2 in its open position, shown in FIGS. 1 to 5, 9 to 10, 13, 16 and 17. In said open position of the safety valve, the medium is able to flow through a valve opening 5, arranged centrally in this case, in the shut-off body 3. The shut-off body 3, which is displaceably guided on the housing inside surface of the valve housing 2 by way of its shut-off body circumference, comprises on the circumferential side a ring seal 6 which seals between the shut-off body 3 on the one side and the housing inside wall of the valve housing 2 on the other side. The retaining element 4 is a highly resilient retaining element and is realized here in particular as a compression spring. As shown in FIG. 3, the valve housing 2 preferably has a fitting connection 21 on the inflow side and a hose connection 22 on the outflow side.

From a comparison of FIGS. 1 to 5, 9 to 10, 13, 16 and 17 on the one hand and FIGS. 6 to 8 and 2 to 21 on the other hand, it is clear that the shut-off body 3 is displaceably guided in the valve housing 2. In the case of a sudden pressure drop in the pipe sections arranged on the outflow side of the safety valve 1, the shut-off body 3 can be displaced in the valve housing 2 in such a manner that said shut-off body 3 is moved against a closing body 7 into the closed position of the safety valve 1 shown in FIGS. 6 to 8 and 20 to 21, in which closed position the closing body 7, which is acted upon by at least one resilient pressing element 8, closes the valve opening 5 in the shut-off body 3 in a sealing manner. The pressing element 8 is realized here as a highly resilient pressing element and in particular as a compression spring.

The closing body 7 acts here as a damping piston when the shut-off body 3 is loaded by additional pressure shocks from the inflow side of the safety valve 1.

It is a particular advantage of the safety valve 1 shown here that it is also possible for an untrained person, where applicable, to move it into the open position of the safety valve 1 again without a special tool when the safety valve 1 has been triggered and the triggered status has been able to be explained and eliminated. A bypass duct which is formed here by the duct sections 9, 10 and 11, is provided for this purpose. In the closed position of the safety valve 1, the bypass duct is openable in such a manner that it connects the inflow side of the shut-off body 3 to the outflow side thereof until the shut-off body 3, once the pressure equalization procedure has been effected by the at least one bypass duct, is moved into the open position of the safety valve 1.

Figure 22:
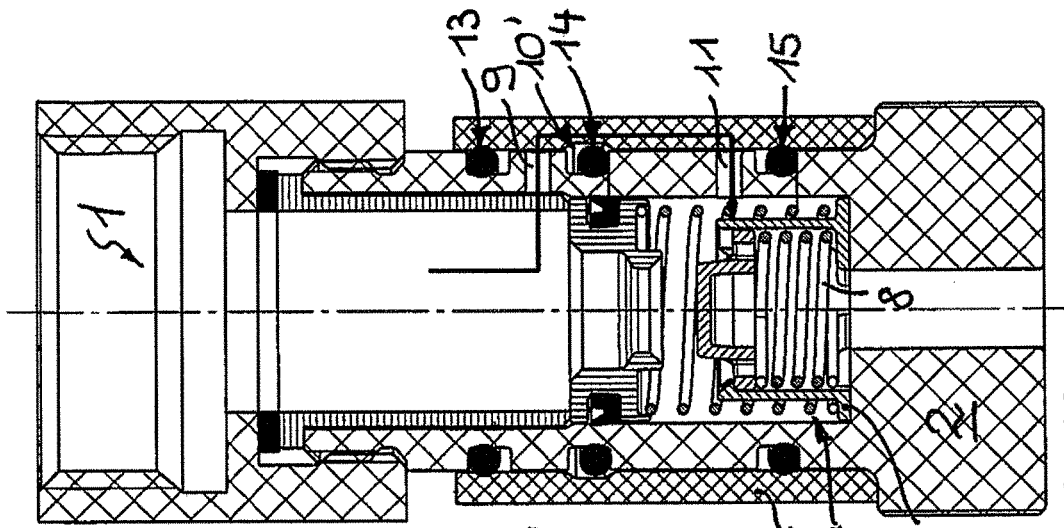
FIG. 22 shows the safety valve from FIGS. 20 and 21 after the pressure equalization has been effected on both sides of the shut-off body, wherein said pressure equalization brings about a return movement of the shut-off body into the open position of the safety valve.
Figure 21:
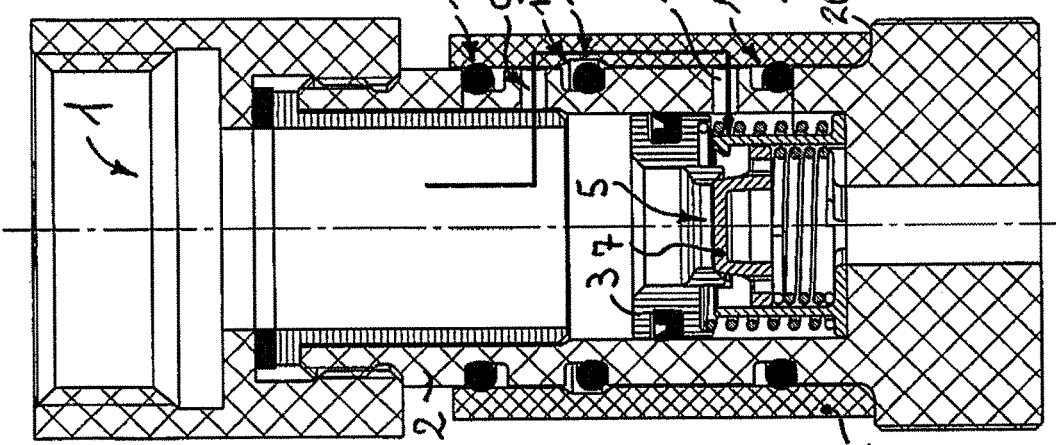
FIG. 21 shows the safety valve from FIG. 20, wherein the sliding element here has already been displaced into the duct open position in order to bring about pressure equalization on the outflow side and on the inflow side of the shut-off body.
Figure 20:
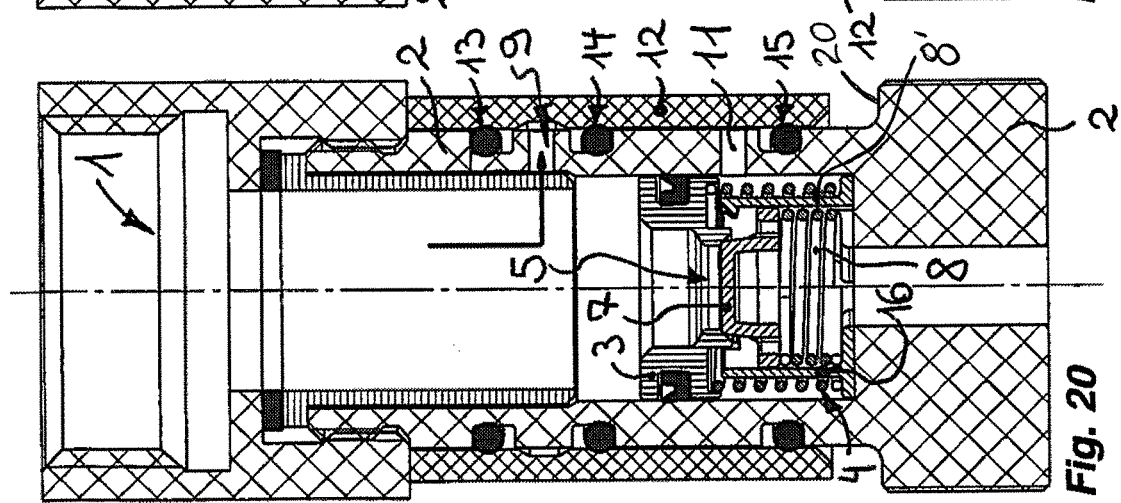
FIG. 20 shows the safety valve already shown in FIGS. 1 and 5 to 10 in its closed position, in which the shut-off body acts upon the sliding element in a sealing manner with its valve opening, wherein the sliding element is still situated here in its duct closed position.
Figure 24:
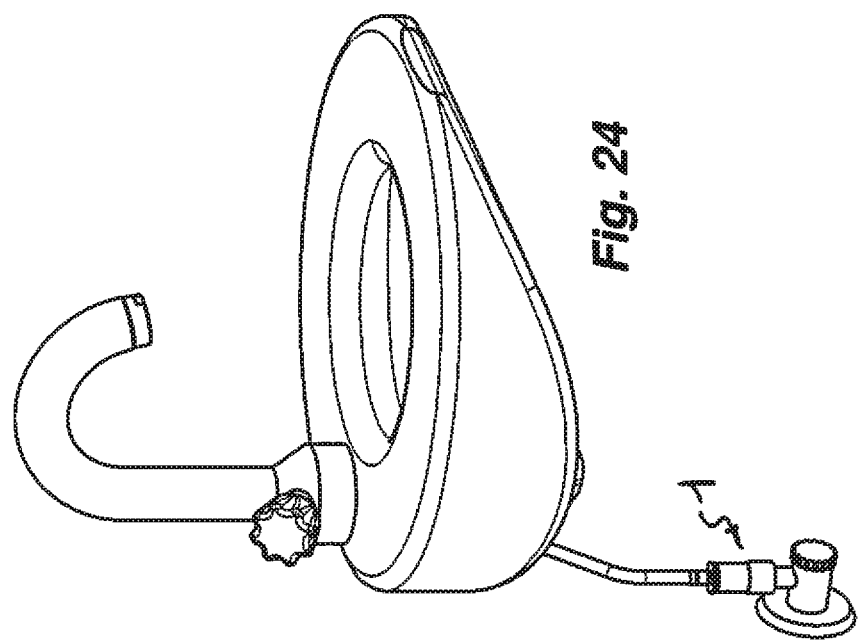
FIG. 24 shows a further application example where a safety valve is inserted into the water pipe leading to a hand washbasin.
Figure 23:
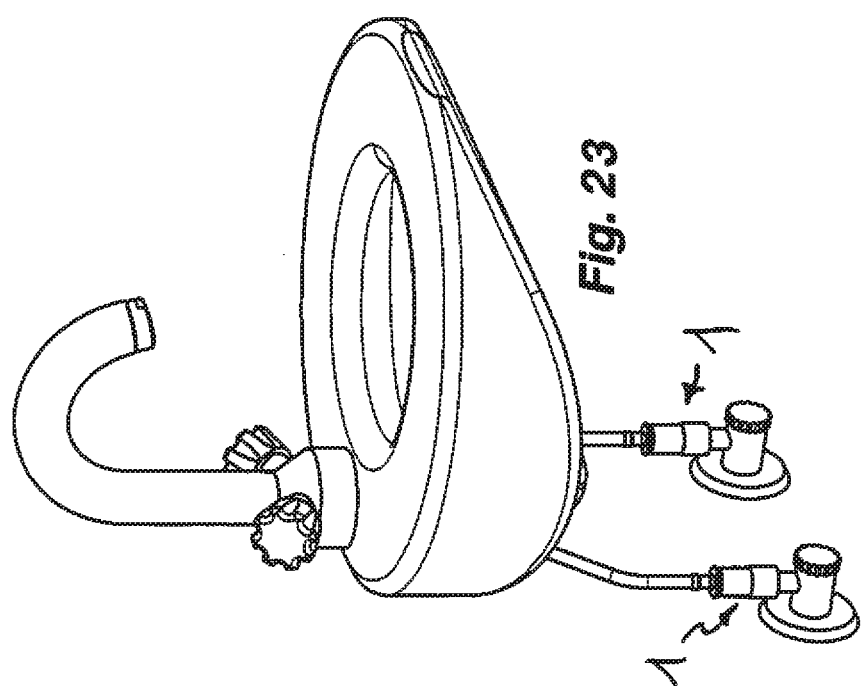
FIG. 23 shows an application example for the safety valve shown here, wherein a safety valve is inserted in each case into the hot and cold water pipe leading to a hand washbasin.

It is clear, in particular from the enlarged representations in FIGS. 20 to 22, that the mouth-side duct sections 9 and 11 are realized as flow-through holes in the valve housing 2, and in that said mouth-side duct sections 9 and 11 are connectable by the duct section 10 which is located in between them and delimits a sleeve-shaped sliding element 12 which is displaceably guided on the outside circumference of the valve housing 2. A circumferential ring groove 10' which only connects the duct sections 9, 10 and 11 together in the duct open position shown in FIG. 21 is provided for this purpose on the inside of the sliding element 12, whilst said ring groove 10' is arranged between two ring seals 13, 14 in the duct closed position and remains non-effective. These ring seals 13, 14 are arranged spaced apart from one another on the outside circumference of the valve housing 2 and are placed such that the outside opening of the duct section 9 is provided between them.

These ring seals 13, 14 seal the ring gap between the sliding element 12 and the housing outside circumference of the valve housing 2 in said region. A further ring seal 15, which seals the ring gap on the side of the outside opening of the duct section 11 remote from the ring seal 14, is provided on the outside circumference of the valve housing 2.

The shut-off body 3 and the closing body 7 are provided in the valve housing 2 of the safety valve 1. The duct sections 9, 11, which are arranged above and below the shut-off body 2, are situated in the valve housing 2. In order to achieve pressure equalization in the valve housing 2 on both sides of the shut-off body 3, the sleeve-shaped sliding element 12 on the outside circumference of the valve housing 2 is displaceably guided in such a manner that the duct sections 9 and 11 are able to be connected to the duct section 10 which connects them and the bypass duct can be moved into its duct open position. The safety valve 1 shown here comprises a valve housing 2 which is preferably adapted to the geometry of the pipe used. The shut-off body 3, which is developed as a closing piston, is displaceably guided in the valve housing 2 relative to the longitudinal direction of the valve housing 2 by the retaining element 4. The retaining element 4 works in opposition to the direction of flow of the medium traversing through the valve housing 2, the shut-off body 3 being sealed in relation to the housing inside wall. The closing body 7 forms a damper piston which is arranged in a separate damper housing below the shut-off body 3 in the flow-through direction of the medium inside the valve housing 2. The damper housing provided for the closing body 7 is formed here by a guide sleeve 16, the closing body 7 protruding beyond the sleeve edge facing the shut-off body 2 with a hat-shaped closing body part region 17. The guide sleeve 16 is engaged around, in turn, by the retaining element 4, which is realized as a helical spring and supports the shut-off body 3 on the opposite side.

In the region above and below the shut-off body 3, which is developed as a closing piston, the valve housing comprises in each case the duct sections 9 and 11 of the bypass duct. The resilient ring seals 13, 14, of which the one sealing ring 13 is situated on the one side of the duct section 9 and the other sealing ring 14 on the other side of the duct section 9, are arranged on the outside circumference of the valve housing 2, on both sides of the duct section 9 situated above the shut-off body 3. The further ring seal 15 is arranged at a spacing from the sealing ring 14 on the side thereof remote from the sealing ring 13.

FIGS. 1 to 5, 9 to 10, 13, 16 and 22 show the safety valve 1 in an operating mode which prevails when the pipes are intact. In contrast, FIGS. 6 to 8, and 20 and 21 show the safety valve in its closed position which has been triggered on the outflow side of the safety valve 1 in the event of an interrupted section of pipe. FIG. 7 shows the safety valve 1 in a triggered state which is, however, damped at the same time. FIGS. 8 to 10 and 20 to 22 show the safety valve 1 in a sequence where a restart of the operating mode is introduced. In FIGS. 9 and 10 and 21 and 22 a pressure equalization procedure is introduced or has already been effected between the inflow and the outflow side of the shut-off body 2 in such a manner that the safety valve 1 is then available again in its operating mode.

During the operating mode shown for example in FIGS. 1 to 5, the duct sections 9, 10 and 11 of the bypass duct are not connected together and the bypass duct is correspondingly closed. If a pipe interruption occurs on the outflow side of the safety valve 1, a pressure difference is forcibly generated as a consequence between the inflow side region of the shut-off body 3 and the outflow side region thereof, as a result of which the safety valve 1 is moved practically automatically into its closed position which is shown, for example, in FIGS. 6 to 8. In said closed position, the shut-off body 3 abuts by way of its valve opening sealingly against the closing body 7 and the flow path which leads through the safety valve 1 is closed. In the case of the triggering of the safety valve 1 shown in FIG. 6, further force can be applied onto the shut-off body 3 and a corresponding pulse can be effected. In this case, the state shown in FIG. 7 is provided where the closing body 7 additionally has the function of a damper piston. If the closing body 7 is effective as a damper, it works against the additional force of the shut-off body 3 in such a manner that a reliable closure between the shut-off body 3 and the closing body 7 is ensured every time. The closing body 7 is situated in the separate housing which is formed by the guide sleeve 16 and is provided in the housing interior on the outlet-side end of the valve housing 2. The closing body 7 is displaceable in the guide sleeve 16 in dependence on the pressure exerted by the shut-off body 3 with the help of the highly resilient pressing element 8 situated in the guide sleeve 16 or by way of a subregion 8' thereof that faces away from the shut-off body 3 located in the guide sleeve 16.

As is clear, for example, from a comparison between FIGS. 8 and 9 and 21 and 22, as a result of axially displacing the sleeve-shaped sliding element 12, which is guided displaceably on the housing outside surface of the valve housing 2, an opening of the bypass duct can be brought about as a result of connecting the duct sections 9, 10 and 11. As a result, pressure equalization is made possible as a result of the pipe pressure present on both sides of the shut-off body 3, with reference to the direction of flow of the medium. The sliding element 12 has to be situated in said position for the entire duration until the pressure equalization procedure has been effected so that the bypass duct remains open. As shown in FIGS. 21 and 22, when the sliding element 12 is moved by the return element 18 into the open position it butts against a sliding stop 20.

Figure 10:
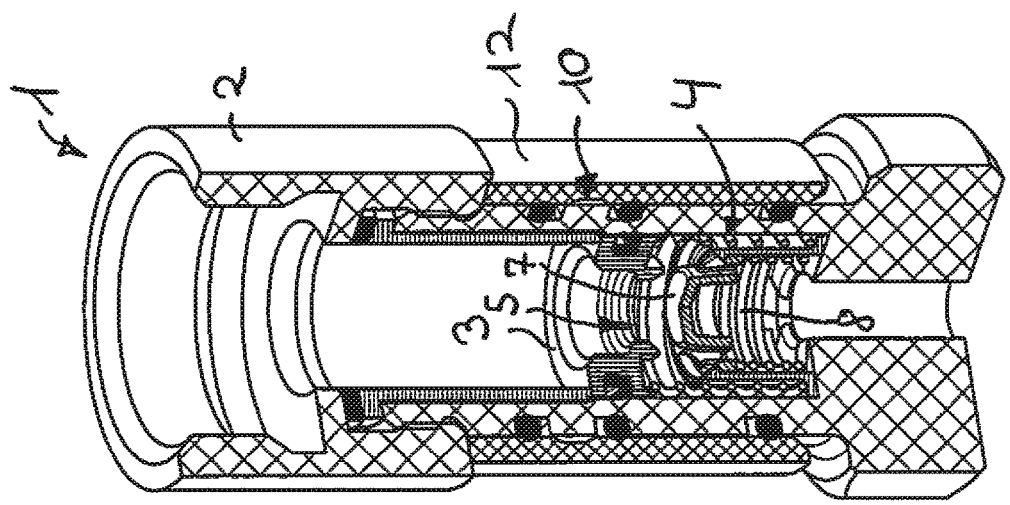
FIG. 10 shows the safety valve from FIGS. 5 to 8, which, once the sliding element has been displaced and the bypass duct closed, is now made available again for renewed triggering in the open position of the safety valve.
Figure 9:
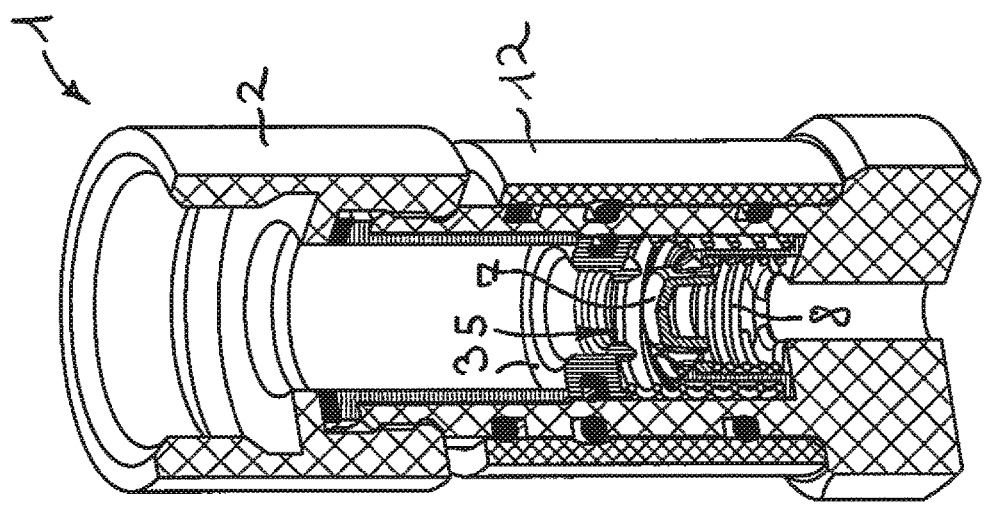
FIG. 9 shows the safety valve from FIGS. 5 to 8, the shut-off body of which, once the pressure equalization has been effected, has now moved into the open position of the safety valve again, wherein the sliding element is still situated in the duct open position.
Figure 8:
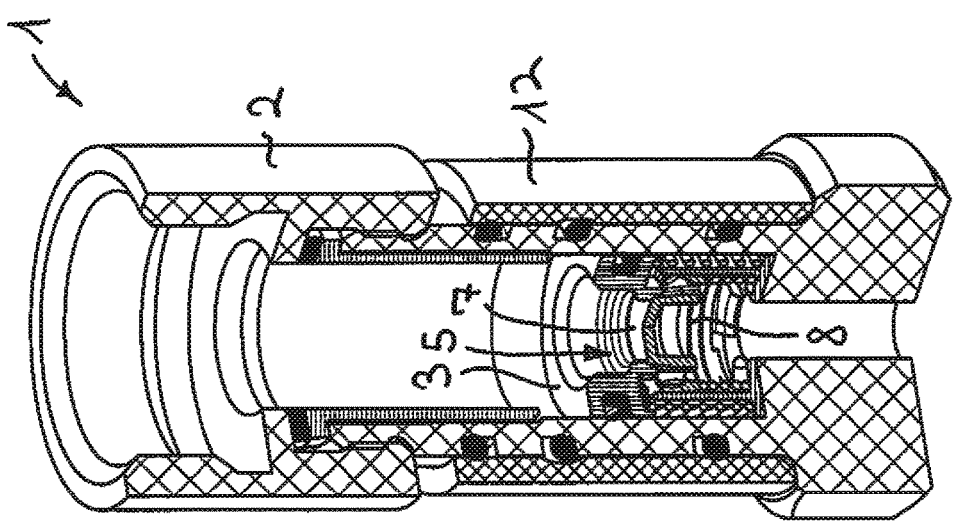
FIG. 8 shows the safety valve from FIGS. 5 to 7, still situated in the closed position, wherein the bypass duct has already been opened by a longitudinal displacement of the manually actuatable sliding element in order to bring about pressure equalization on the outflow side and on the inflow side of the shut-off body.
Figure 16:
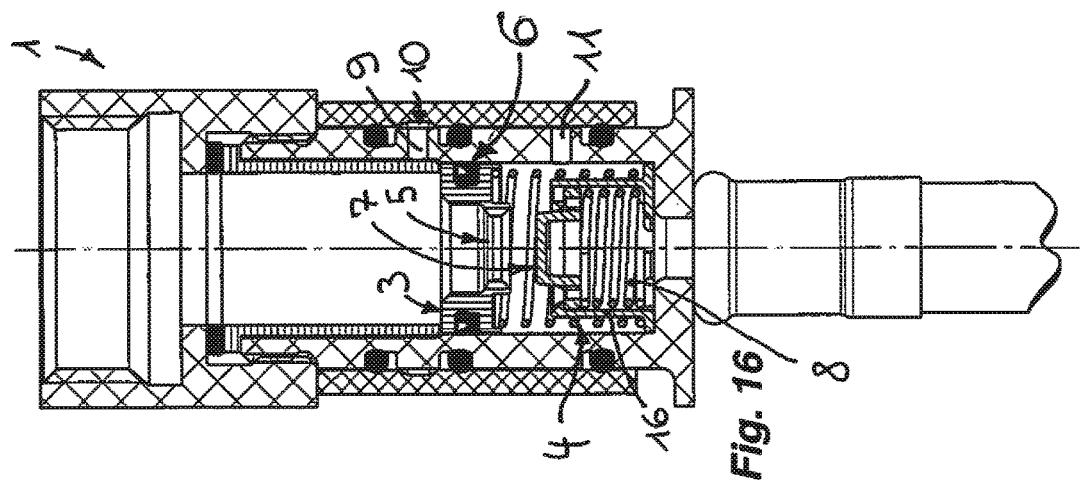
FIG. 16 shows a longitudinally sectioned side view of the safety valve from FIGS. 2 and 14 to 15.
Figure 15:
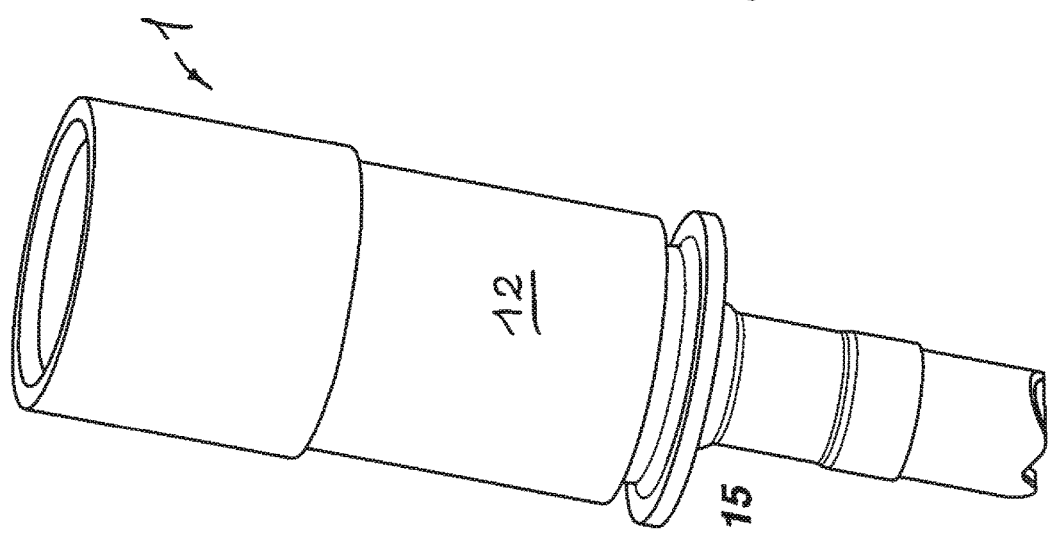
FIG. 15 shows a side perspective representation of the safety valve from FIGS. 2 and 14.
Figure 14:
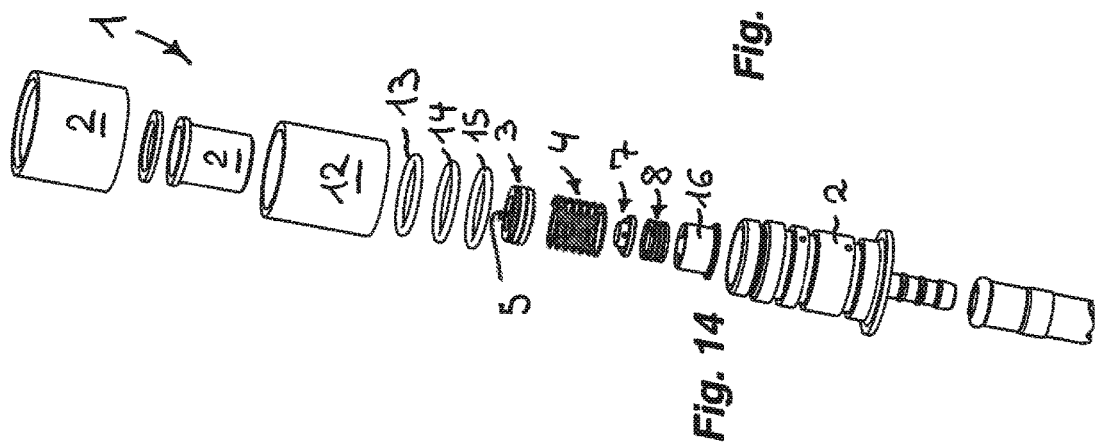
FIG. 14 shows an exploded representation of the individual parts of the safety valve from FIG. 2.

FIGS. 9, 10 and 22 show the safety valve 1 after the pressure equalization has been effected. In order to reset the safety valve in its usual operating mode again according, for example, to FIGS. 1 to 4, the sliding element 12 is displaced in such a manner that the duct sections 9, 10 and 11 are no longer connected and the bypass duct is closed again. Complete disconnection of the safety valve 1 is consequently not necessary in order to restore the normal operating state, for example after eliminating possible pipe damage.

Instead of the sliding movement on the sliding element 12 shown here, it is also possible to open and close the bypass duct as a result of pressing, turning or tilting movements.

It is particularly advantageous when an acoustic and/or visual signal is effected as soon as a pressure equalization has been on both sides of the shut-off body 3. In the case of the realizations 1.2 and 1.4 of the safety valve 1 shown in FIGS. 2 and 4, a preferably highly resilient return element 18 is provided which is realized in particular as a helical spring and which moves the sliding element 12 from the duct open position back again into the duct closed position. In the case of said realization, the return of the sleeve-shaped sliding element 12 is already achieved as a result of manually triggering the sliding element 12 such that pushing said sliding element 12 back by hand is superfluous. Further acoustic and/or visual signals can be advantageous when the safety valve 1 is triggered from its open position into its closed position or when the sliding element 12 is effective as a damper piston on account of pressure pulses.

It is also possible for the housing provided here for the closing body 7 and formed by the guide sleeve 16 to be integrally mounted on the valve housing 2 of the safety valve 1. Another realization, not shown here, can provide that an insert cartridge, which consists of the closing body 7, the pressing element 8, the housing provided for closing body 7 as well as a damper piston and a damper spring, is insertable in the valve housing 2 of the safety valve 1.

According to a further realization of the invention that is not shown here, the closing body 7, which is provided as a damper piston, and/or the shut-off body 3 can be provided in such a manner in the valve housing 2 of the safety valve 1 that a movement of the named components can be effected without displacement and without using helical springs, for example by the seal of the shut-off body 3 always retaining the same mounting position in relation to the housing inside wall of the valve housing 2, whilst the shut-off body 3 performs an axial movement inside the valve housing 2 of the safety valve 1 in dependence on the pressure of the traversing medium. This is achieved, for example, as a result of using a correspondingly resilient material to make the shut-off body 3. It is further possible for the shut-off body 3 to consist of a combination of resilient and non-resilient material.

From the application examples in FIGS. 23 to 27, it is recognizable that the safety valve 1 shown here is able to be used, for example, in the sanitary and also the household sector. In this case, the safety valve 1 can be used in all pipes in which any medium and in particular a fluid, such as, for example, water or gas, is to be conducted. The safety valve 1 protects said pipes against a sudden leakage and against uncontrolled escaping of the medium conducted therein.

The invention claimed is:

1. A safety valve (1) comprising a valve housing (2) having a housing interior in which a shut-off body (3) is provided, said shut-off body (3) is held by at least one retaining element (4) against a force of a fluid traversing through the valve housing (2) in an open position of the safety valve (1) in which the fluid traverses a valve opening (5) in the shut-off body (3) and said shut-off body (3) is displaceable in the valve housing (2) in such a manner that, in case of a pressure drop on an outflow side, said shut-off body (3) is moved against a closing body (7) into a closed position of the safety valve (1) in which the closing body (7), which is acted upon by at least one pressing element (8), closes the valve opening (5) in the shut-off body (3), at least one bypass duct which, in the closed position of the safety valve (1), is openable such that the at least one bypass duct connects an inflow side of the shut-off body (3) with the outflow side thereof until the shut-off body (3), when the pressure has been equalized by the at least one bypass duct, is moved into the open position of the safety valve (1), the at least one pressing element (8) is guided displaceably by a subregion of said at least one pressing element that faces away from the shut-off body (3) located in a guide sleeve (16) arranged in the housing interior of the valve housing (2).

2. The safety valve as claimed in claim 1, wherein the at least one retaining element (4) comprises a resilient retaining element.

3. The safety valve as claimed in claim 2, wherein the at least one retaining element (4) comprises a helical spring.

4. The safety valve as claimed in claim 1, wherein the at least one pressing element (8) comprises a resilient pressing element.

5. The safety valve as claimed in claim 4, wherein the at least one pressing element (8) is a helical spring.

6. The safety valve as claimed in claim 5, wherein the retaining element (4) comprises a helical spring that engages around the guide sleeve (16).

7. The safety valve as claimed in claim 1, wherein the valve opening (5) is arranged centrally in the shut-off body (3).

8. The safety valve as claimed in claim 1, wherein the bypass duct has three duct portions (9, 10, 11), of which mouth-side ones of the duct portions (9, 11) comprise throughflow holes in the valve housing (2), and the mouth-side duct portions (9, 11) are connected via the duct portion (10) situated in between which is delimited or bounded by a sleeve-shaped sliding element (12) guided displaceably on an outer circumference of the valve housing (2).

9. The safety valve as claimed in claim 8, wherein the sliding element (12) on the outer circumference of the valve housing (2) is displaceable from the closed position against a return force of at least one return element (18) into the open position of the safety valve (1).

10. The safety valve as claimed in claim 9, wherein the at least one return element (18) comprises a resilient return element.

11. The safety valve as claimed in claim 10, wherein the at least one return element (18) takes the form of a helical spring.

12. The safety valve as claimed in claim 10, wherein the sliding element (12) moved by the return element (18) into the open position butts against a sliding stop.

13. The safety valve as claimed in claim 1, wherein the valve housing (2) has a fitting connection on the inflow side or a hose connection on the outflow side.

14. The safety valve as claimed in claim 13, wherein the valve housing (2) is connected to a supply line at its inflow-side fitting connection.

15. The safety valve as claimed in claim 1, wherein the valve opening (5) is arranged coaxially to a longitudinal axis of the shut-off body (3).

\* \* \* \* \*